United States Patent [19]

Schemmel

[11] Patent Number: 5,021,683

[45] Date of Patent: Jun. 4, 1991

[54] CIRCUIT ARRANGEMENT COMPRISING TWO PARALLEL BRANCHES FOR TRANSMITTING A BINARY SIGNAL

[75] Inventor: Hans-Robert Schemmel, Nuremberg, Fed. Rep. of Germany

[73] Assignee: U.S. Philips Corp., New York, N.Y.

[21] Appl. No.: 478,793

[22] Filed: Feb. 12, 1990

[30] Foreign Application Priority Data

Feb. 24, 1989 [DE] Fed. Rep. of Germany ....... 3905689

[51] Int. Cl.⁵ ........................................... H03K 9/003
[52] U.S. Cl. .................................. 307/441; 307/456; 307/464; 307/473; 307/600
[58] Field of Search ............... 307/441, 443, 445, 456, 307/464, 473, 600

[56] References Cited

U.S. PATENT DOCUMENTS

| | | | |
|---|---|---|---|
| 4,066,910 | 1/1978 | Huntington | 307/242 |
| 4,154,978 | 5/1979 | Tu | 307/242 |
| 4,250,570 | 2/1981 | Tsang et al. | 307/441 |
| 4,419,595 | 12/1983 | Reiner | 307/445 |
| 4,475,049 | 10/1984 | Smith et al. | 307/441 |
| 4,480,198 | 10/1984 | Gass | 307/441 |
| 4,608,504 | 8/1986 | Yamamoto | 307/441 |
| 4,611,136 | 9/1986 | Fujie | 307/597 |
| 4,626,707 | 12/1986 | Arita et al. | 307/441 |
| 4,761,572 | 8/1988 | Tanizawa | 307/443 |
| 4,835,422 | 5/1989 | Dike et al. | 307/443 |
| 4,849,657 | 7/1989 | Boisvert | 307/441 |
| 4,928,022 | 5/1990 | Marum | 307/441 |

Primary Examiner—Stanley D. Miller
Assistant Examiner—T. Cunningham
Attorney, Agent, or Firm—Jack D. Slobod

[57] ABSTRACT

A circuit arrangement for transmitting in an undisturbed manner a binary signal through two parallel branches even in case of breakdown, failure or interruption of operating voltages of individual components of a branch, and also to enable a disturbance-free exchanging of individual modules in a branch in which each branch has its own supply means fed by an input for the binary signal to be transmitted, which supply means has two gates together producing an inverting and a non-inverting output. Each branch has its own receiver which is connected to the non-inverted output of the supply means of that branch and the inverting output of the supply means of the other branch. Each receiver includes a difference amplifier which provides the output of the branch, and a network of resistors and diodes which feeds the difference amplifier.

6 Claims, 1 Drawing Sheet

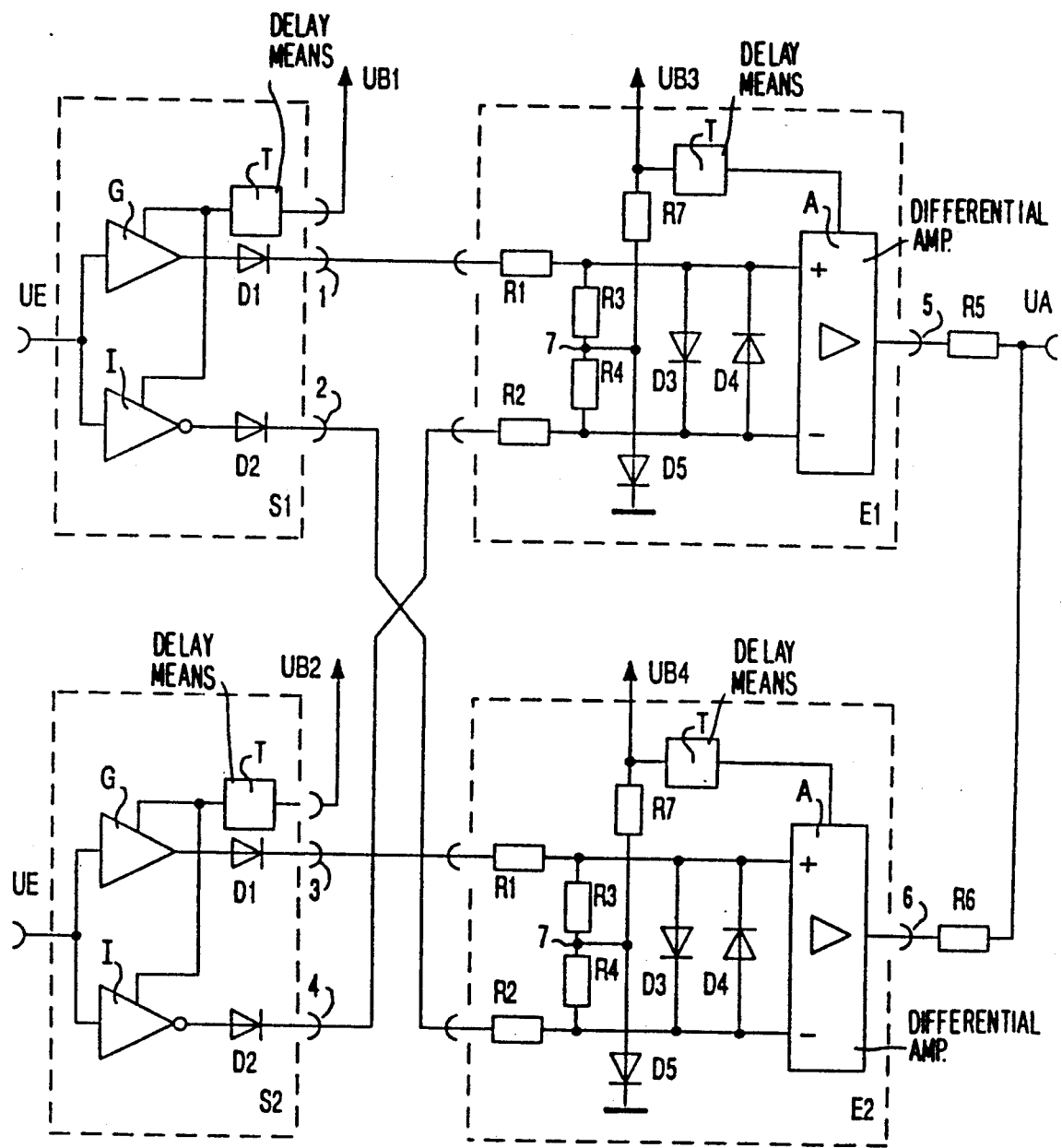

CIRCUIT ARRANGEMENT COMPRISING TWO PARALLEL BRANCHES FOR TRANSMITTING A BINARY SIGNAL

BACKGROUND OF THE INVENTION

The invention relates to a circuit arrangement comprising two parallel branches for transmitting a binary signal, one signal source each applying a binary signal to each branch Such circuit arrangements are necessary, for example, for clock supply means in information technology For this purpose, in order to fulfil the requirements as to operating reliability, it is advantageous to arrange the most important modules in e.g. two parallel branches, a binary signal, e. g. a clock signal, being applied to each branch from its independent source. The two binary signals are synchronised and show great similarity. One branch is used while the other branch is kept in reserve. In case of breakdown or failure of the utilized branch, the branch kept in reserve can assure proper functioning.

SUMMARY OF THE INVENTION

It is an object of the invention to provide a circuit arrangement of the type mentioned in the opening paragraph, which transmits the binary signal in an undisturbed manner without a switchover in case of breakdown, failure or interruption of the operating voltage of individual circuit components in a branch, whilst also the exchanging of individual modules in a branch is possible without disturbing the transmission of the binary signal.

The object is achieved by means of a circuit arrangement of the type mentioned in the opening paragraph, in that the branches comprise each a supply means fed by the binary signal, each means comprising two gates that have an inverting and a non-inverting output, in that each branch comprises at least one receiver that includes a differential amplifier, to which receiver the non-inverting output of the associated supply means and the inverting output of the other supply means are connected and in that the operating voltages are furnished through time delay means.

BRIEF DESCRIPTION OF THE DRAWING

The invention will be further explained with reference to the drawing in which:

The sole drawing FIGURE shows a circuit arrangement comprising two parallel branches for transmitting a binary signal in accordance with the invention.

DETAILED DESCRIPTION OF THE INVENTION

The sole FIGURE shows a redundant electronic circuit arrangement comprising two parallel branches for transmitting a binary signal. An identical binary signal UE is applied to each branch from two independent sources. The first branch comprises a first supply means S1 fed by an operating voltage UB1 and a first receiver E1 fed by an operating voltage UB3. The second branch connected in parallel to the first branch has the same structure as the first branch and comprises a second supply means S2 fed by an operating voltage UB2 and also includes a second receiver E2 fed by an operating voltage UB4.

Each supply means comprises a first gate G having a non-inverting output connected to the anode of a diode D1, and also includes a second gate I having an inverting output connected to the anode of a diode D2. The operating voltages UB1, OB2 of the supply means S1, S2 are furnished through time delaY means T. A binary signal UE is applied to the power supply means S1, S2 from two independent sources (not shown in the drawing) and switched to the inputs of the gates G. The binary signals are synchronised so that they show great similarity A signal 1 on the cathode of the diode D1 of the first transmitter S1 is applied to the non-inverting input of a difference amplifier A of the first receiver E1 through a resistor R1, whereas a signal 2 on the cathode of the diode D2 of the first transmitter S1 is switched to the inverting input of the difference amplifier A of the second receiver E2 through a resistor R2 Accordingly, a signal 3 on the cathode of the diode D1 of the second transmitter S2 is switched to the non-inverting input of the differential amplifier A of the second receiver E2 and a signal 4 on the cathode of the diode D2 of the second transmitter S2 is switched to the inverting input of the difference amplifier A of the first receiver E1. At the outputs of the differential amplifiers A of the two receivers E1, E2 are available signals 5, 6 which are combined to one output signal UA through the decoupling resistors R5, R6.

The operating voltages UB3, UB4 of the differential amplifiers A of receivers E1, E2 are also applied through time delay means T. The inputs of the differential amplifiers A are decoupled through a resistor network R1, R2, R3, R4 and their voltages are limited across parallel diodes D3, D1 For this purpose the anode of diode D3 is connected to the non-inverting input of the differential amplifier A whereas the cathode is connected to the inverting input. The diode D4 is connected in opposite polarity to D3. In addition, the inputs of the differential amplifier A are interconnected via a series connection of the resistors R3, R4, the operating voltage UB3 being applied over their common junction 7 through a resistor R7. The junction 7 is also connected to ground across a diode D5.

In order to avoid reactions on the function of the circuitry, the outputs of the gates G, I respectively, are to become high-ohmic together with the inverting output (inverter I) of the supply means in case of failure For this purpose the gate G and the inverter I of the supply means S1, S2 are advantageously arranged as tri-state buffers in TTL technology, i.e. the output of the gate G and the inverter I may assume also a third high-ohmic state in addition to the two states 1 or 0.

Each supply means and receiver is arranged as a plug-in module. The necessary ground contacts of each module are then realised as so-called leading ground contacts, i e when the individual modules are plugged in, first the ground contacts are established before the live connections are made.

The circuit arrangement of the exemplary embodiment shown in the FIGURE thus provides that the binary signal UE, also in case of breakdown, failure or interruptions of operating voltages of individual circuit components is transmitted in an undisturbed manner. Furthermore, the exchanging of individual modules can also be realised without disturbing the transmission of the binary signal UE.

If the operating voltage UB1 of the first transmitter and thus of the gate G and inverter I fails, the diodes D1 and D2 will e.g. decouple the lines carryinq the signals 1 2 at the outputs of gate G and inverter I The receivers E1, E2 will then be supplied with the signals 3, 4 of the second transmitter S2 in an undisturbed manner. The circuit arrangement will behave accordinglY if the oPerating voltage UB2 of the second transmitter fails. Since the gate G and the inverter I are arranged as tri-state buffers in TTL technology, their outputs will assume a high-ohmic state if the operating voltages fail.

The inputs to the receivers E1, E2 are decoupled through the resistors R1, R2, their outputs through the resistors R5, R6 so that, e.g. if the operating voltage UB3 of the first receiver fails, the second receiver will be further fed by means of the signals 2, 3 and will thus transmit the binary signal UE in an undisturbed manner.

The breakdown of a transmitter S1 or S2 or the failure of the binary signal UE at the input of a transmitter S1, S2 will be ineffective with respect to the transmission of the binary signals UE owing to the resistor network R1, R2, R3, R4 and owing to the grounded diodes D5 of the receiver E1, E2 and also as a result of a suitably high sensitivity of the differential amplifier A.

The great sensitivity of the differential amplifier A leads to high switching voltages when individual modules are exchanged. Consequently, in order to avoid this problem, the voltages of the differential amplifier A are limited by means of the diodes D3, D4. In order to further maintain the switching voltages at a low level especially when a module is plugged in, the operating voltages UB1, UB2, UB3, UB4 of the transmitters S1, S2 and receivers E1, E2 are supplied through time delay means T.

The reliability may even be enhanced by connecting further receivers in parallel with the receivers E1, E2.

I claim:

1. Circuit arrangement comprising two parallel connected branches for transmitting a binary signal, an input for applying said binary signal (UE) to each branch, characterized in that each branch comprises a supply means (S1, S2) coupled to the input, each supply means comprising two gates coupled to said input, one of said two gates having an inverted output and another of said two gates having a non-inverted output, each branch further comprises a receiver (E1, E2) that includes a differential amplifier (A), having the non-inverted output of the supply means of the respective branch and the inverted output of the supply means of the other branch connected thereto and wherein operating voltages (UB1, UB2, UB3, UB4) are coupled to the gates and the differential amplifiers through time delay means (T).

2. Circuit arrangement as claimed in claim 1, characterized in that the gates (G, I) of the supply means (S1, S2) are arranged as tri-state buffers in TTL technology.

3. Circuit arrangement as claimed in claim 1, characterized in that the receivers (E) further comprise a resistor network (R1, R2, R3, R4) and rectifier diodes (D3, D4).

4. Circuit arrangement as claimed in claim 1, characterized in that the supply means (S1, S2) and the receivers (E1, E2) are arranged as plug-in modules.

5. Circuit arrangement as claimed in claim 2, characterized in that the receivers (E) further comprise a resistor network (R1, R2, R3, R4) and rectifier diodes (D3, D4).

6. Circuit arrangement as claimed in claim 5, characterized in that the supply means (S1, S2) and the receivers (E1, E2) are arranged as plug-in modules.

* * * * *